(12) United States Patent
Nomura et al.

(10) Patent No.: US 11,620,501 B2
(45) Date of Patent: Apr. 4, 2023

(54) NEURAL NETWORK APPARATUS

(71) Applicant: KABUSHIKI KAISHA TOSHIBA, Minato-ku (JP)

(72) Inventors: Kumiko Nomura, Shinagawa (JP); Takao Marukame, Chuo (JP); Yoshifumi Nishi, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 824 days.

(21) Appl. No.: 16/564,344

(22) Filed: Sep. 9, 2019

(65) Prior Publication Data
US 2020/0302275 A1    Sep. 24, 2020

(30) Foreign Application Priority Data
Mar. 18, 2019    (JP) .............................. JP2019-049871

(51) Int. Cl.
*G06N 3/063*    (2006.01)
*G06N 3/04*    (2006.01)
*G06F 16/901*    (2019.01)

(52) U.S. Cl.
CPC ......... *G06N 3/063* (2013.01); *G06F 16/9027* (2019.01); *G06N 3/04* (2013.01)

(58) Field of Classification Search
CPC ........ G06N 3/063; G06N 3/04; G06N 3/0454; G06F 16/9027
See application file for complete search history.

(56) References Cited

U.S. PATENT DOCUMENTS

2019/0102669 A1*  4/2019  Chen ................... G06N 3/0454

FOREIGN PATENT DOCUMENTS

| JP | 8-87475 A | 4/1996 |
|----|-----------|--------|
| JP | 2011082964 A | 4/2011 |
| JP | 2018-514872 A | 6/2018 |

OTHER PUBLICATIONS

Firuzan, A., Modarressi, M., Daneshtalab, M., & Reshadi, M. (Oct. 2018). Reconfigurable network-on-chip for 3D neural network accelerators. In 2018 Twelfth IEEE/ACM International Symposium on Networks-on-Chip (NOCS) (pp. 1-8). IEEE. (Year: 2018).*

(Continued)

*Primary Examiner* — Brian M Smith
*Assistant Examiner* — Henry Trong Nguyen
(74) *Attorney, Agent, or Firm* — Oblon, McClelland, Maier & Neustadt, L.L.P.

(57) ABSTRACT

According to an embodiment, a neural network apparatus includes cores, routers, a tree path, and a short-cut path. The cores are provided according to leaves in a tree structure, each core serving as a circuit that performs calculation or processing for part of elements of the neural network. The routers are provided according to nodes other than the leaves in the tree structure. The tree path connects the cores and the routers such that data is transferred along the tree structure. The short-cut path connects part of the routers such that data is transferred on a route differing from the tree path. The routers transmit data output from each core to any of the cores serving as a transmission destination on one of routes in the tree path and the short-cut path such that the calculation or the processing is performed according to a structure of the neural network.

9 Claims, 12 Drawing Sheets

(56) References Cited

OTHER PUBLICATIONS

Simeonov, P. L., & Ehresmann, A. C. (2017). Towards a First Implementation of the WLIMES Approach in Living System Studies Advancing the Diagnostics and Therapy in Personalized Medicine. CoRR. (Year: 2017).*

Moradi, S. et al., "A Scalable Multicore Architecture With Heterogeneous Memory Structures for Dynamic Neuromorphic Asynchronous Processors (DYNAPs)," IEEE Transactions on Biomedical Circuits and Systems, vol. 12, No. 1, Feb. 2018, 17 pages.

* cited by examiner

CROSSING PART

NEURAL NETWORK APPARATUS

CROSS-REFERENCE TO RELATED APPLICATIONS

This application is based upon and claims the benefit of priority from Japanese Patent Application No. 2019-049871, filed on Mar. 18, 2019, the entire contents of which are incorporated herein by reference.

FIELD

Embodiments described herein relate generally to a neural network apparatus.

BACKGROUND

In recent years, techniques for realizing a neuromorphic processor by using a neural network implemented by hardware have been suggested. Such a neuromorphic processor includes a transfer path for transferring data calculated by a neuron in the neural network to another neuron.

For realizing the neuromorphic processor, the neural network is required to carry out a calculation process and a learning process in parallel. Thus, the neural network needs to carry out a process for propagating target data to be calculated in a forward direction and a process for propagating data for learning in a backward direction in parallel. Therefore, the neuromorphic processor is required to include a large scale of transfer path in order to avoid traffic congestion.

However, the neuromorphic processor including a large scale of transfer path consumes much power, so that operation of the processor may be inefficient.

DETAILED DESCRIPTION

According to an embodiment, a neural network apparatus includes a plurality of cores, a plurality of routers, a tree path, and a short-cut path. The plurality of cores is provided in accordance with a plurality of leaves in a tree structure, each core serving as a circuit that performs calculation or processing for part of elements of the neural network. The plurality of routers is provided in accordance with nodes other than the plurality of leaves in the tree structure. The tree path connects the plurality of cores and the plurality of routers such that data is transferred along the tree structure. The short-cut path connects part of the plurality of routers such that data is transferred on a route differing from the tree path. The plurality of routers transmit data, which is output from each of the plurality of cores, to any of the plurality of cores serving as a transmission destination on one of routes included in the tree path and the short-cut path such that the calculation or the processing is performed in accordance with a structure of the neural network.

A neural network apparatus 10 according to one embodiment is described with reference to the drawings. The neural network apparatus 10 according to the embodiment is capable of efficiently transferring data and reducing traffic congestion.

Figure 1:
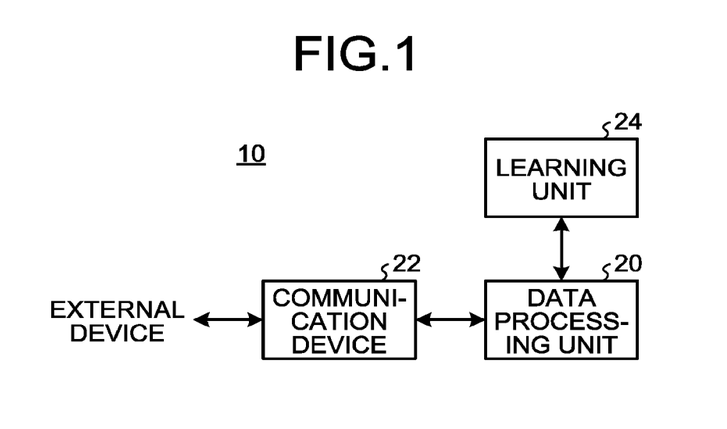
FIG. 1 is a structure diagram illustrating a neural network apparatus according to an embodiment.

FIG. 1 is a diagram illustrating a structure of the neural network apparatus 10 according to the embodiment. The neural network apparatus 10 includes a data processing unit 20, a communication device 22, and a learning unit 24.

The data processing unit 20, the communication device 22, and the learning unit 24 may be mounted in one semiconductor device or mounted in a dispersed manner in semiconductor devices. The learning unit 24 may be achieved by a processor.

The neural network apparatus 10 receives input data from an external device. The neural network apparatus 10 performs a calculation process on the received input data in accordance with a neural network. After that, the neural network apparatus 10 transmits output data, which results from the calculation process according to the neural network, to the external device.

The data processing unit 20 performs a normal calculation process based on the neural network. As the normal calculation process based on the neural network, the data processing unit 20 performs, for example, various information processes including a pattern recognition process, a data analysis process, and a control process.

The data processing unit 20 performs a learning process in parallel to the normal calculation process. By the learning process, the data processing unit 20 changes coefficients (or weights) included in the neural network in order to perform the normal calculation process more properly.

The communication device 22 exchanges data with the external device. Specifically, in the normal calculation process, the communication device 22 receives the input data, which is a calculation target, from the external device. The communication device 22 transmits output data, which corresponds to a calculation result, to the external device.

The learning unit 24 acquires the output data that is output from the data processing unit 20 in the normal calculation process. In the learning process, the learning unit 24 generates data for learning, which is propagated to the neural network in the backward direction, and supplies the data for learning to the data processing unit 20.

Figure 2:
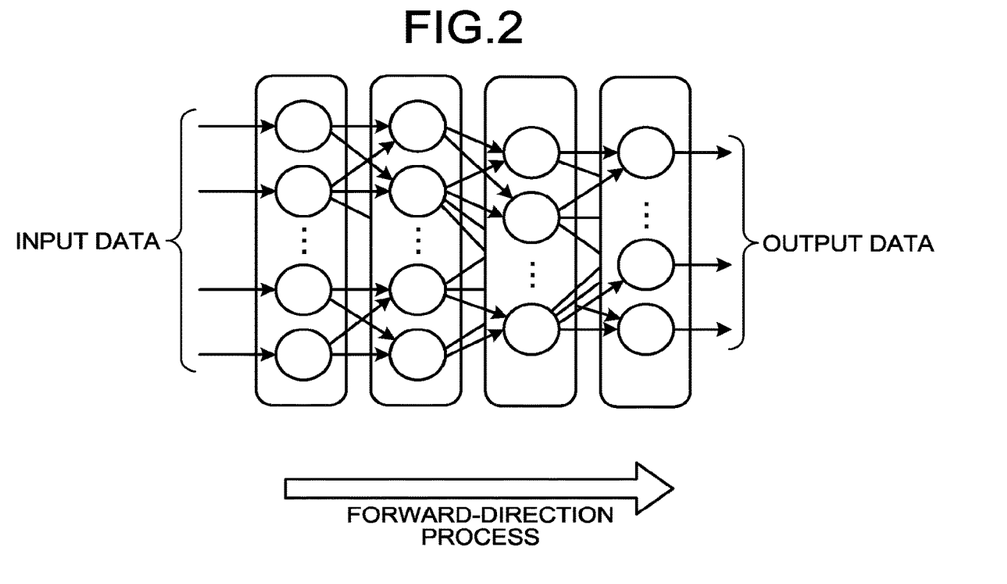
FIG. 2 is a diagram illustrating a forward-direction process in the neural network.

FIG. 2 is a diagram illustrating the normal calculation process (forward-direction process) in the neural network.

The neural network includes two or more layers. Each of the layers performs a predetermined calculation or a predetermined process on the received data, or performs a predetermined calculation and a predetermined process. Each of the layers included in the neural network includes two or more calculating units. The number of calculating units included in a single layer may be different for each layer.

In each calculating unit, an activation function is given. The activation function may be different for each layer. In the same layer, the activation function may be different for each calculating unit. A coefficient (weight) is given to a link that connects between the calculating units. When data is propagated from a calculating unit to a next calculating unit through a link, the neural network multiplies the coefficient given to the link by that data. The coefficients are changed as appropriate by the learning process.

In the normal calculation process in the neural network, the data processing unit 20 performs the forward-direction process, in which calculation is executed at each layer while calculation data is propagated in the forward direction over the layers in the neural network. Specifically, in the forward-direction process, the data processing unit 20 supplies the input data to the input layer. Subsequently, the data processing unit 20 propagates the calculation data, which is output from each layer, to the subsequent layer in the forward direction. Then, the data processing unit 20 transmits the calculation data as the output data, which is output from the output layer, to the external device.

Figure 3:
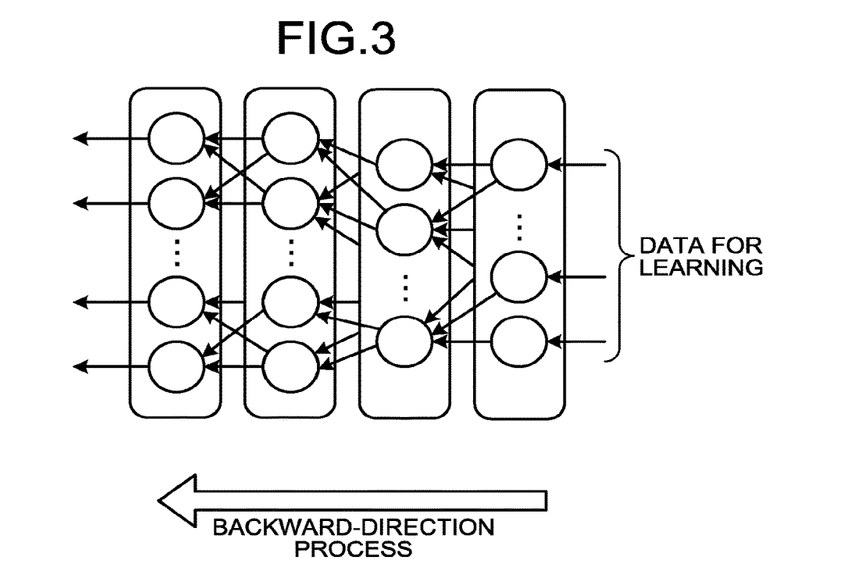
FIG. 3 is a diagram illustrating a backward-direction process in the neural network.

FIG. 3 is a diagram illustrating the learning process (backward-direction process) in the neural network. For each calculating unit, an error function is given. The error function is a derived function of the activation function that is given to the corresponding calculating unit. In other words, the error function is the differential of the activation function that is given to the corresponding calculating unit.

The learning unit 24 generates the data for learning when the forward-direction process is finished. The learning unit 24 generates, as the data for learning, data for learning that represents an error of output data output in the forward-direction process.

Subsequently, in the backward-direction process, the data processing unit 20 supplies the data for learning, which has been generated by the learning unit 24, to the output layer. Then, the data processing unit 20 propagates pieces of data, which are output from the respective layers, to the next layer in the backward direction.

Figure 4:
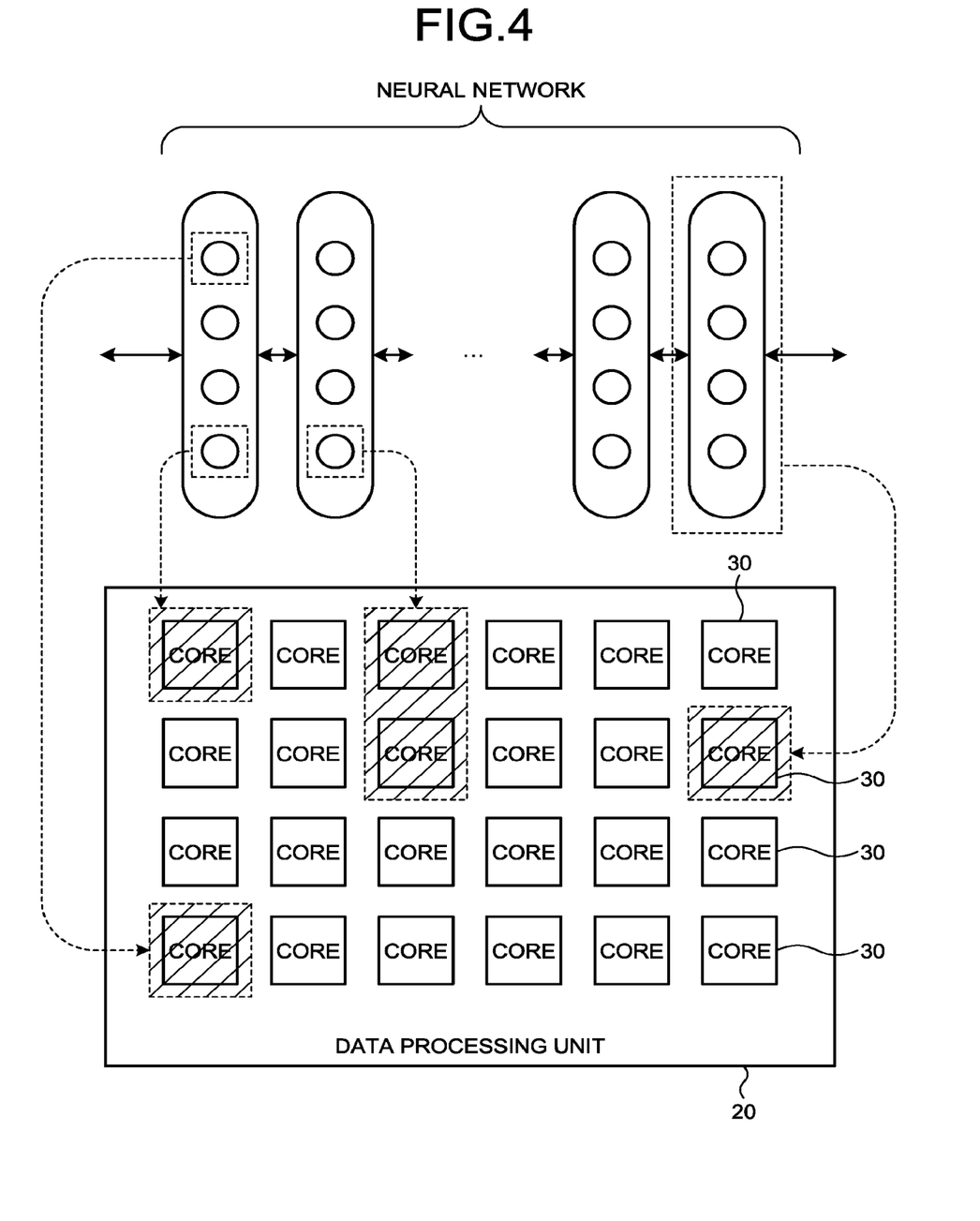
FIG. 4 is a diagram illustrating correspondence between cores and elements in the neural network.

FIG. 4 is a diagram illustrating correspondence between elements included in the neural network and cores 30 in the data processing unit 20.

The data processing unit 20 includes two or more cores 30. Each of the cores 30 performs calculation or processing for part of elements in the neural network. Each of the cores 30 may be a processor, a dedicated hardware circuit, a digital circuit, or an analog circuit. Each of the cores 30 may include a storage unit to store coefficients included in the neural network.

To each of the cores 30, any one of elements of the neural network is allocated in advance. Each of the cores 30 performs calculation or processing for the corresponding element that is allocated in advance among the elements included in the neural network.

Examples of the elements included in the neural network include calculation of the activation function, function calculation in the learning, multiplication of the coefficient given to the link, addition of data multiplied by the coefficient, acquisition of data from the external device or the layer in the previous stage, output of data to the external device or the layer in the subsequent stage, acquisition of the data for learning from the learning unit 24 or the layer in the subsequent stage, and output of the data for learning to the learning unit 24 or the layer in the previous stage. The elements are allocated to the cores 30 such that all elements in the neural network are implemented in at least any of the cores 30.

The process to be performed in a single core 30 may be the process to be performed in a single calculating unit, for example. Specifically, the core 30 may perform, for a single calculating unit in a certain layer, multiplication of the coefficient given to the link, addition of pieces of data received from the layer in the previous stage, calculation of the activation function, calculation of the function in the learning, or the like.

The calculation or the process to be performed in the single core 30 may be calculation of part of a single calculating unit. Specifically, while a core 30 may perform calculation of the activation function in a single calculating unit, another core 30 may perform multiplication and addition of the coefficient in the same calculating unit. Alternatively, the calculation or the processing to be performed in the single core 30 may be all processes in the calculating units included in a single layer.

In such data processing unit 20, it is capable of carrying out processes of the elements in the neural network in a dispersed manner among two or more cores 30.

Figure 5:
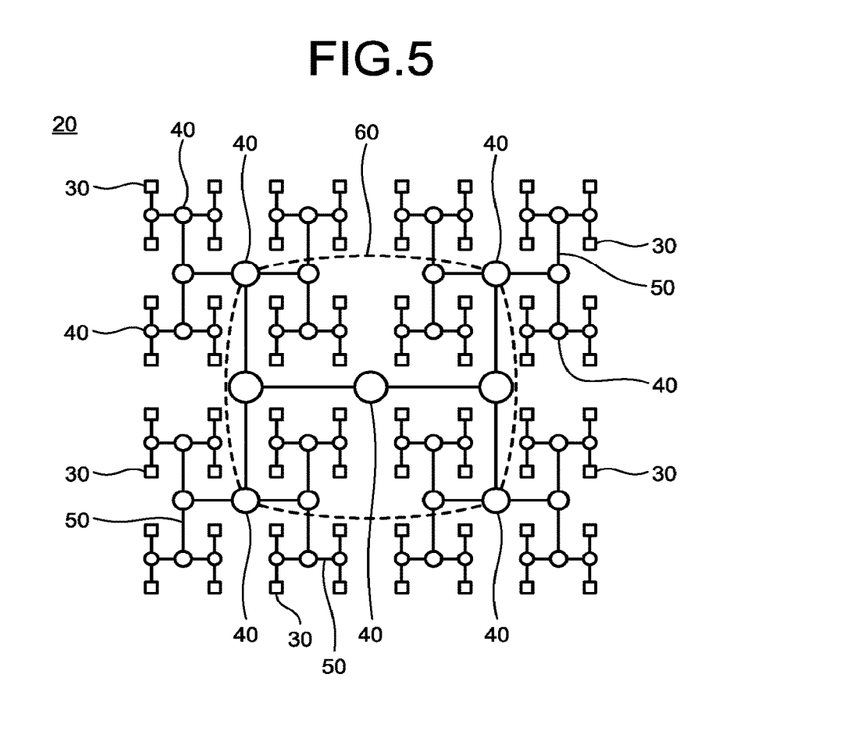
FIG. 5 is a diagram illustrating connection and a structure of a data processing unit.

FIG. 5 is a diagram illustrating connection and a structure of the data processing unit 20. The data processing unit 20 includes the cores 30, routers 40, a tree path 50, and a short-cut path 60.

The cores 30 are provided in accordance with leaves in the tree structure. Each of the leaves is a node that does not have a lower node in the tree structure. In the drawing, each core 30 is depicted with a rectangular symbol.

The routers 40 are provided in accordance with nodes other than the leaves in the tree structure. In the drawing, each router 40 is depicted with a circular symbol.

The tree path 50 connects between the cores 30 and the routers 40 such that the data is transferred in accordance with the tree structure. The tree path 50 includes two or more tree lines. Each of the tree lines connects the router 40 provided at a parent node and the router 40 (or the core 30) provided at a child node. Each of the tree lines transfers data in a bidirectional manner. In the drawing, the tree path 50 is depicted with a solid line that connects two routers 40 or a solid line that connects the core 30 and the router 40.

The short-cut path 60 connects part of the routers 40 such that data is transferred on a route differing from the tree path 50. The short-cut path 60 includes one or more short-cut lines. Each of the one or more short-cut lines connects between two routers 40 that do not have the parent-child relation in the tree structure. Each of the short-cut lines may transfer data either in a bidirectional manner or in a one-way manner. In the drawing, the tree path 50 is depicted with a dotted line that connects two routers 40.

Each of the routers 40 receives data from the core 30 connected via the tree line, or from another router 40 connected via the tree line or the short-cut line. Each of the routers 40 transmits the received data to the core 30 connected via the tree line or to another router 40 connected via the tree line or the short-cut line.

Such routers 40 transmit data, which is output from each of the cores 30, to any of the cores 30 each serving as a transmission destination through one of the routes included in the tree path 50 and the short-cut path 60 such that, calculation or processing is performed in accordance with the structure of the neural network. Thus, the data processing unit 20 as a whole can function as the neural network.

Note that the tree structure may have any branched structure. For example, a binary tree or a ternary tree may be used for the tree structure. The tree structure may include different branched structures. For example, part of the binary tree and part of the ternary tree may be mingled with the tree structure.

Figure 6:
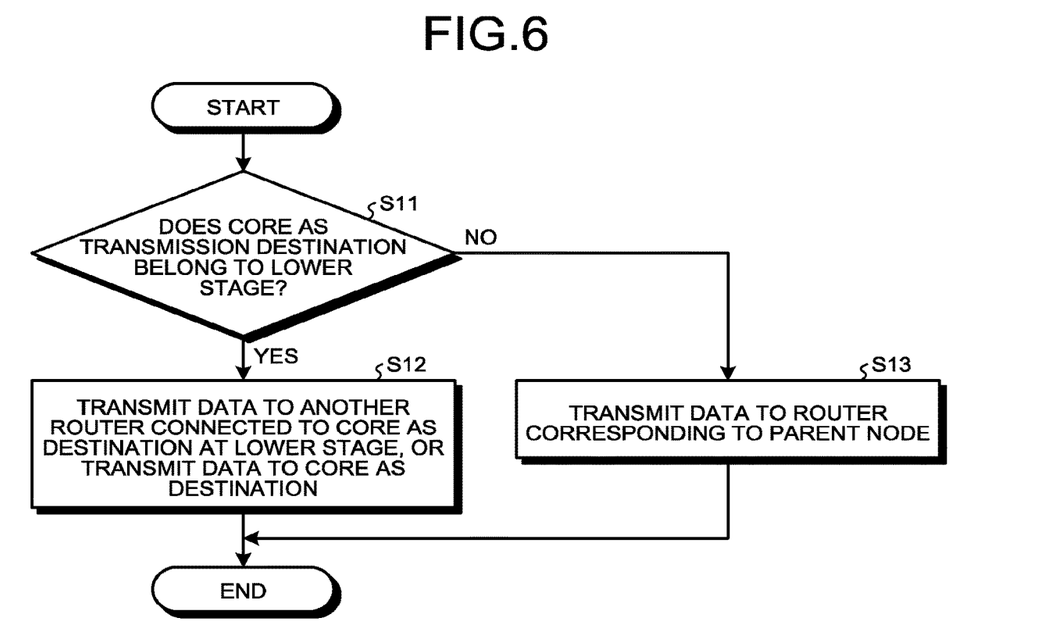
FIG. 6 is a flowchart of a process of a router that is not connected to a short-cut path.

FIG. 6 is a flowchart of a process of the router 40 that is not connected to the short-cut path 60. The router 40 that is not connected to the short-cut path 60, namely, the router 40 that is connected to another router 40 only through the tree path 50 performs the process illustrated in FIG. 6 when data is received.

First, at S11, the router 40 determines whether the core 30 as a transmission destination of the received data belongs to a lower stage in the tree structure. When the router 40 determines that the core 30 as the transmission destination is a lower node (Yes at S11), processing is advanced to S12. When the router 40 determines that the core 30 as the transmission destination is not the lower node (No at S11), processing is advanced to S13.

At S12, the router 40 transmits the received data to another router 40, which is connected to the core 30 as the transmission destination in the lower stage, among one or more routers 40 connected to the lower stage (i.e., child nodes). Note that, if the core 30 as the transmission destination is directly connected to the router 40 which has been received data, this router 40 transmits the received data directly to the core 30 as the transmission destination.

At S13, the router 40 transmits the received data to another router 40 in an upper stage (i.e., a parent node). After the process in S12 or S13, the router 40 terminates processing according to the flowchart.

Figure 7:
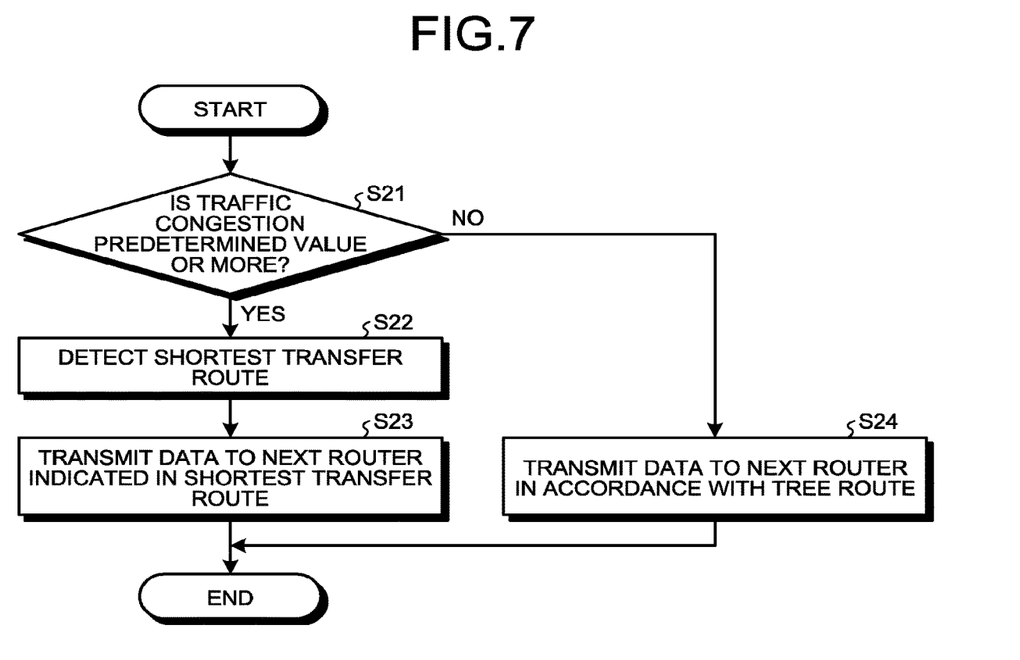
FIG. 7 is a flowchart of a process of a router that is connected to a short-cut path.

FIG. 7 is a flowchart of a process of the router 40 that is connected to the short-cut path 60. The router 40 connected to the short-cut path 60, that is, the router 40 connected to both the tree path 50 and the short-cut path 60, performs the process in FIG. 7 when data is received.

First, at S21, the router 40 determines whether a level of traffic congestion is a predetermined value or more. For example, when the quantity of data held in the router 40 is equal to or more than a prescribed value, the router 40 determines that the traffic congestion is the predetermined value or more. Alternatively, the router 40 may determine, based on the information received from another router 40, whether the traffic congestion is the predetermined value or more.

When the traffic congestion is the predetermined value or more (Yes at S21), processing is advanced to S22. When the traffic congestion is not the predetermined value or more (No at S21), processing is advanced to S24.

At S22, the router 40 detects a transfer route for transmitting the received data to the core 30 as the transmission destination from among the routes included in the tree path 50 and the short-cut path 60. For example, the router 40 detects the shortest transfer route from this router 40 to the core 30 as the transmission destination. In this case, as the shortest transfer route, the router 40 may detect at least the router 40 (next router 40) or the core 30, which receives the data next, instead of detecting an entire route from the router 40 to the core 30 as the transmission destination.

Subsequently, at S23, the router 40 transmits the received data to the next router 40 indicated in the transfer route. Thus, when the transfer route includes the short-cut path 60, the router 40 can transmit the data to the core 30 as the transmission destination faster than transmitting the data through the tree path 50.

At S24, the router 40 transmits the received data to the next router 40 in accordance with the tree path 50. Specifically, at S24, the router 40 transmits the received data to the next router 40 by performing the same process as that in FIG. 6. Thus, the router 40 can steadily transmit the data to the core 30 as the transmission destination through the tree path 50. After the process in S23 or S24, the router 40 terminates processing according to the flowchart.

By performing the process described above, when the traffic congestion is the predetermined value or more, the router 40 can transfer the received data faster. In addition, when the traffic congestion is not the predetermined value or more, the router 40 can transfer the received data steadily by the simple process.

Note that, at S22, the router 40 may determine whether the received data has a predetermined attribute, instead of determining whether the traffic congestion is the predetermined value or more. For example, the router 40 determines whether the received data has the predetermined attribute by using identification information included in a header or the like in the received data. When the received data has the predetermined attribute (Yes at S22), processing is advanced to S23; otherwise (No at S22) processing is advanced to S24.

Specifically, when the received data is data to be transmitted in the forward direction in the neural network, the router 40 determines that the received data has the predetermined attribute and advances the process to S23. When the received data is data to be transmitted in the backward direction in the neural network, the router 40 determines that the received data does not have the predetermined attribute and advances the process to S24.

By performing the process described above, the router 40 can transmit the data having the predetermined attribute (for example, the data to be transmitted in the forward direction) faster. In addition, the router 40 can transmit the data not having the predetermined attribute (for example, the data to be transmitted in the backward direction) steadily and easily.

As described above, the neural network apparatus 10 according to the present embodiment can efficiently transfer data through the tree path 50 and can reduce the traffic congestion by the short-cut path 60.

Figure 8:
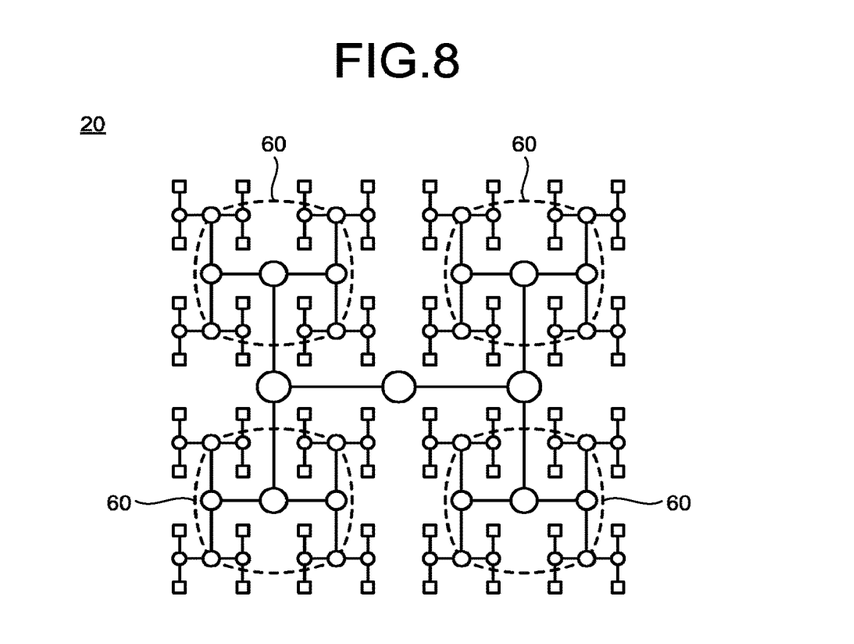
FIG. 8 is a diagram illustrating short-cut paths, each connecting routers in a ring shape.

FIG. 8 is a diagram illustrating short-cut paths 60, each connecting two or more routers 40 in a ring shape. The short-cut paths 60 may include a route that connects two or more of the routers 40, which correspond to part of the routers 40, in the ring shape. The ring shape refers to a route that circles and does not have end portions.

In this case, the two or more routers 40 connected in the ring-shaped path may transmit and receive data such that the data circulates in a bidirectional manner or may transmit and receive data such that the data circulates in a one-way manner. The neural network apparatus 10 described above can transfer data between two or more routers 40 connected in the ring shape faster than the tree path 50.

Figure 9:
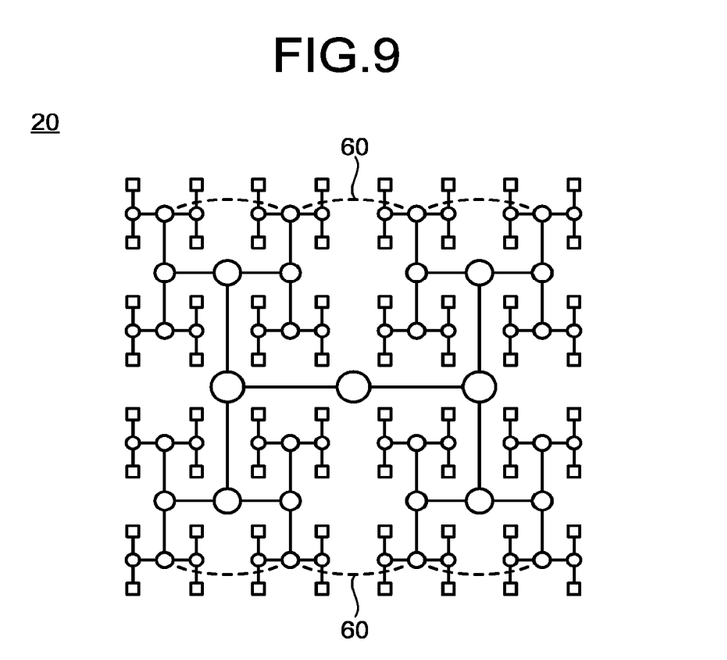
FIG. 9 is a diagram illustrating short-cut paths, each connecting routers in a line shape.

FIG. 9 is a diagram illustrating short-cut paths 60, each connecting two or more routers 40 in a line shape. The short-cut path 60 may include a route that connects two or more of the routers 40, which correspond to part of the routers 40, in the line shape. The line shape refers to a route that has two ends and does not circle.

In this case, the two or more routers 40 connected to the line-shaped route transmit and receive data such that the data is transferred in a bidirectional manner. The neural network apparatus 10 described above can transfer data between two or more routers 40 connected in the line shape faster than the tree path 50.

Figure 10:
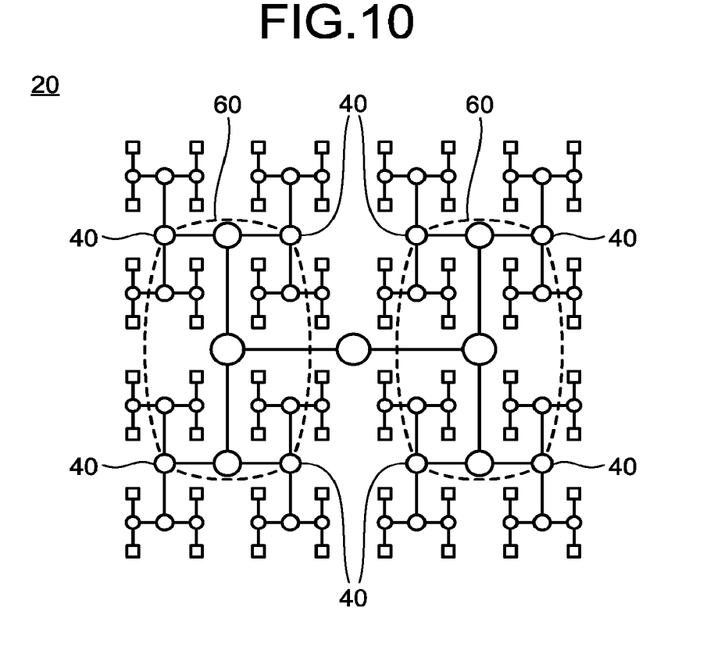
FIG. 10 is a diagram illustrating short-cut paths, each connecting routers disposed in a predetermined layer.

FIG. 10 is a diagram illustrating short-cut paths 60, each connecting two or more routers 40 disposed in a predetermined layer. The short-cut path 60 may be a route that connects two or more routers 40 disposed in a predetermined layer in the tree structure.

For example, two or more routers 40 connected to the short-cut path 60 in the ring shape are entirely disposed in a single layer in the tree structure. Note that two or more routers 40 connected to the short-cut path 60 in the line shape may be entirely disposed in one layer. The neural network apparatus 10 described above can transfer data between two or more routers 40 disposed in the predetermined layer faster than the tree path 50.

Figure 11:
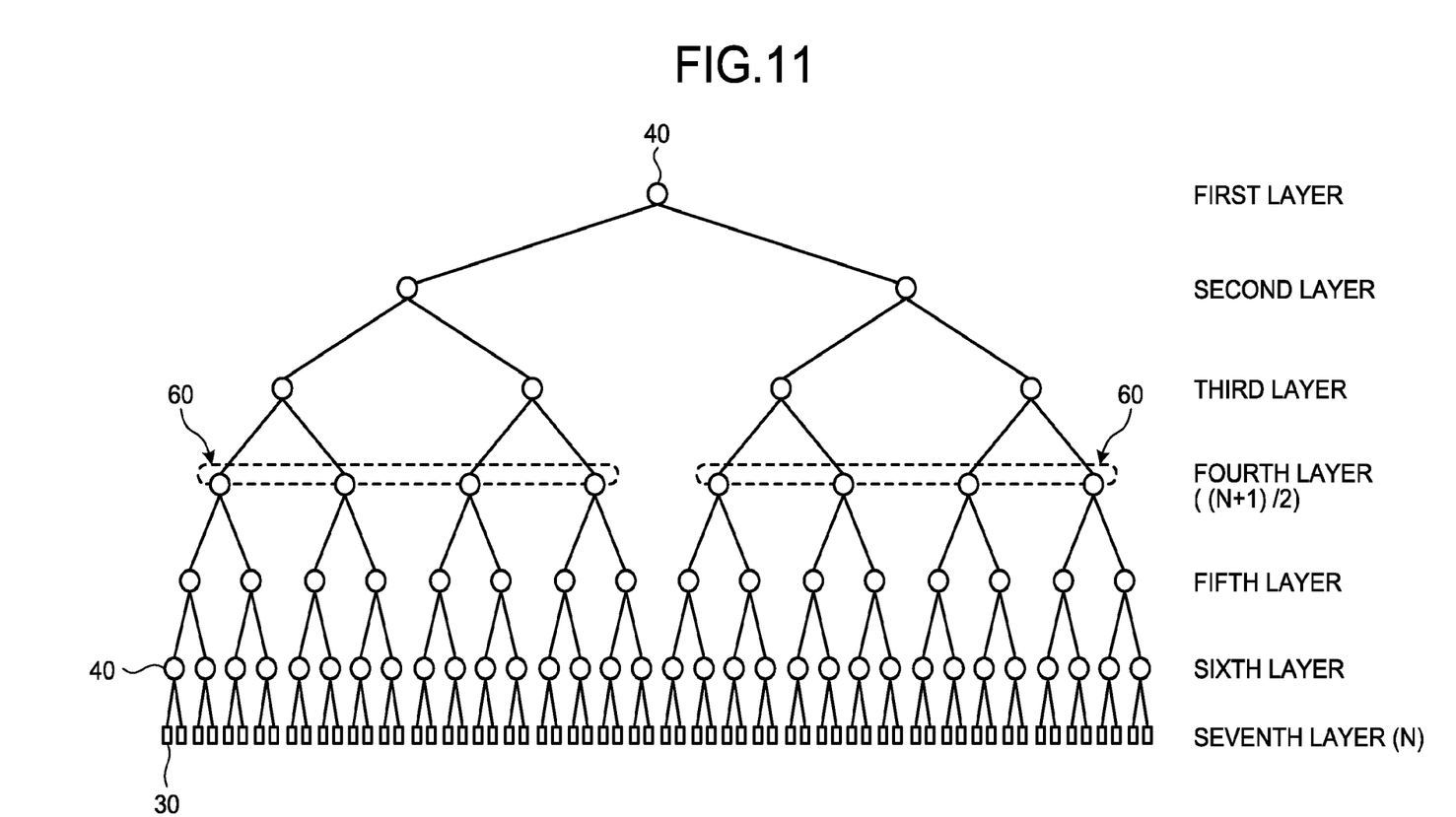
FIG. 11 is a diagram illustrating short-cut paths that connect routers disposed in a layer at an intermediate stage.

FIG. 11 is a diagram illustrating routers 40 connected by a tree path 50 and short-cut paths 60 that connect two or more routers 40 disposed in a same layer at an intermediate stage. The short-cut path 60 may be a route that connects two or more routers 40 disposed in a same layer at an intermediate stage which is between a root node and leaves in the tree structure.

For example, assuming that the layer number including leaves farthest from the root node is N, the short-cut path 60 may be a route connecting two or more routers 40 disposed in an $\{N/2\}$-th, $\{(N/2)+1\}$-th, $\{(N+1)/2\}$-th, or $\{(N-1)/2\}$-th layer from the root node.

More specifically, when N is an even number, the two or more routers 40 connected to the short-cut path 60 are disposed in the $\{N/2\}$-th or $\{(N/2)+1\}$-th layer from the root node. When N is an odd number, the two or more routers 40 connected to the short-cut path 60 are disposed in the $\{(N+1)/2\}$-th, or $\{(N-1)/2\}$-th layer from the root node.

In the example in FIG. 11, N is equal to 7. Thus, the two or more routers 40 connected to the short-cut path 60 are disposed in the fourth layer.

In the neural network apparatus 10 described above, two routers 40 disposed in the layer at the intermediate stage in the tree structure can transmit and receive the data directly to/from one another. Thus, the neural network apparatus 10 can efficiently reduce the delay of data that may occur when data is transferred along the tree structure.

Figure 12:
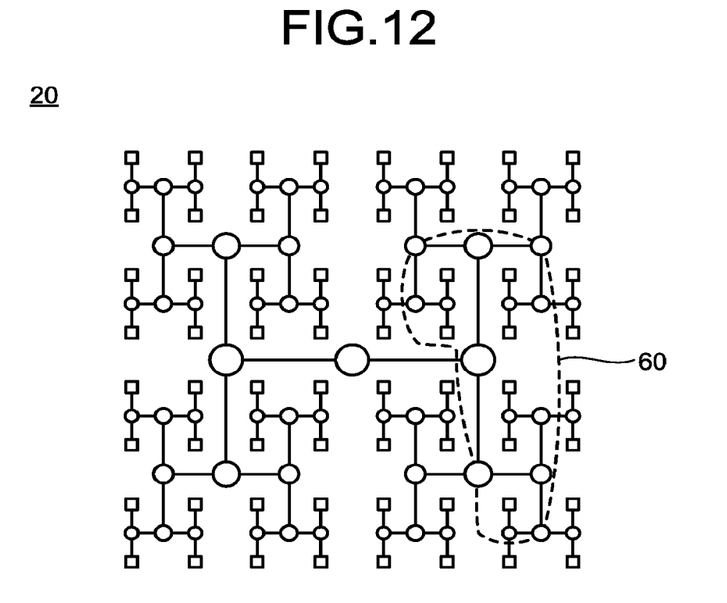
FIG. 12 is a diagram illustrating a short-cut path that connects routers disposed in different layers.

FIG. 12 is a diagram illustrating short-cut path 60 connecting two or more routers 40 disposed in different layers. The short-cut path 60 may include the route that connects two or more routers 40 disposed in two different layers in the tree structure. For example, two or more routers 40 connected to the short-cut path 60 in the ring shape or the line shape may be disposed in different layers in the tree structure.

The neural network apparatus 10 described above can compose a route that efficiently short-cuts a route transferring a large quantity of data. Thus, the neural network apparatus 10 is capable of performing the faster calculation in the neural network.

Figure 13:
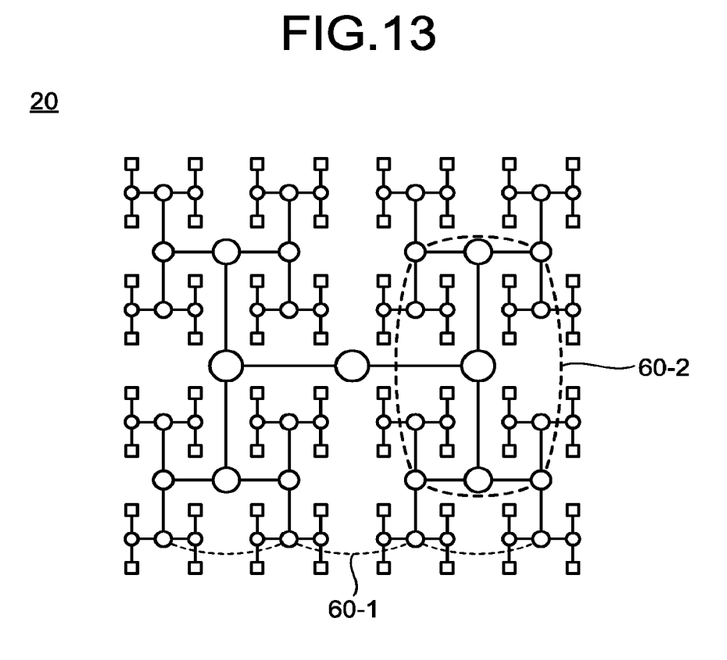
FIG. 13 is a diagram illustrating a first example of short-cut paths.

FIG. 13 is a diagram illustrating a first example of the short-cut paths 60. The data processing unit 20 may include two or more short-cut paths 60. In this case, the short-cut paths 60 may differ in, for example, shape or the number of routers 40 to connect.

For example, in the example in FIG. 13, the data processing unit 20 includes a first short-cut path 60-1 in a line shape and a second short-cut path 60-2 in a ring shape. The data processing unit 20 may include three or more short-cut paths 60.

Figure 14:
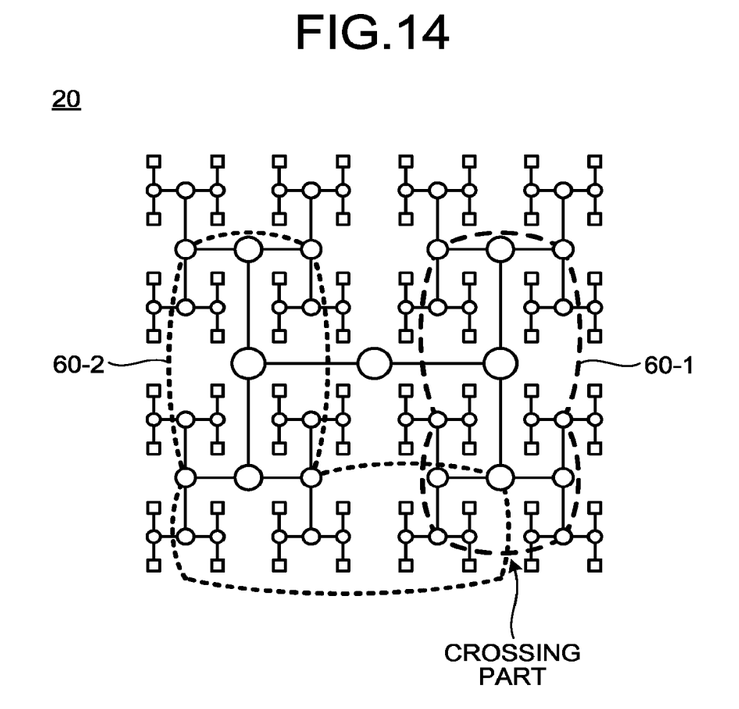
FIG. 14 is a diagram illustrating a second example of short-cut paths.

FIG. 14 is a diagram illustrating a second example of short-cut paths 60. The first short-cut path 60-1 and the second short-cut path 60-2 may have crossing parts where these paths cross each other.

Figure 15:
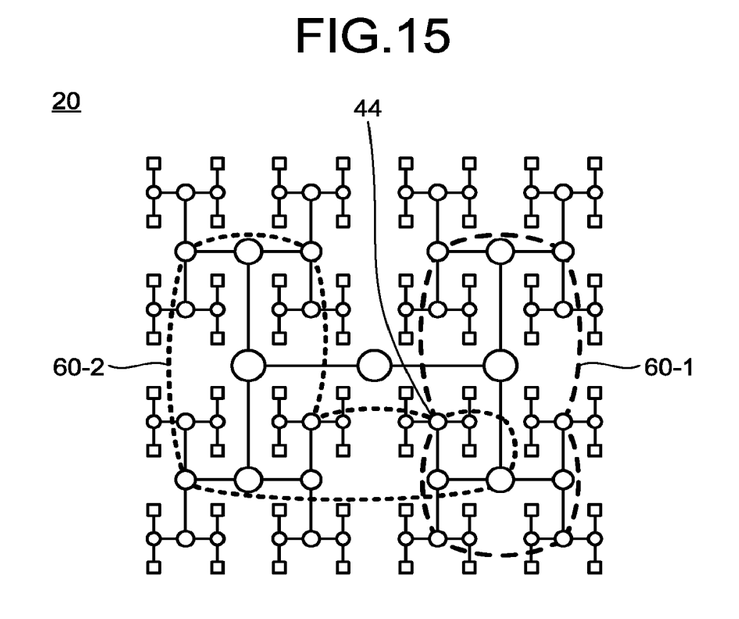
FIG. 15 is a diagram illustrating a third example of short-cut paths.

FIG. 15 is a diagram illustrating a third example of short-cut paths 60. The first short-cut path 60-1 and the second short-cut path 60-2 may be connected to a router 40 in common (a common router 44).

In the example in FIG. 15, the common router 44 is connected to both the first short-cut path 60-1 and the second short-cut path 60-2. The common router 44 may be connected to three or more short-cut paths 60.

Figure 16:
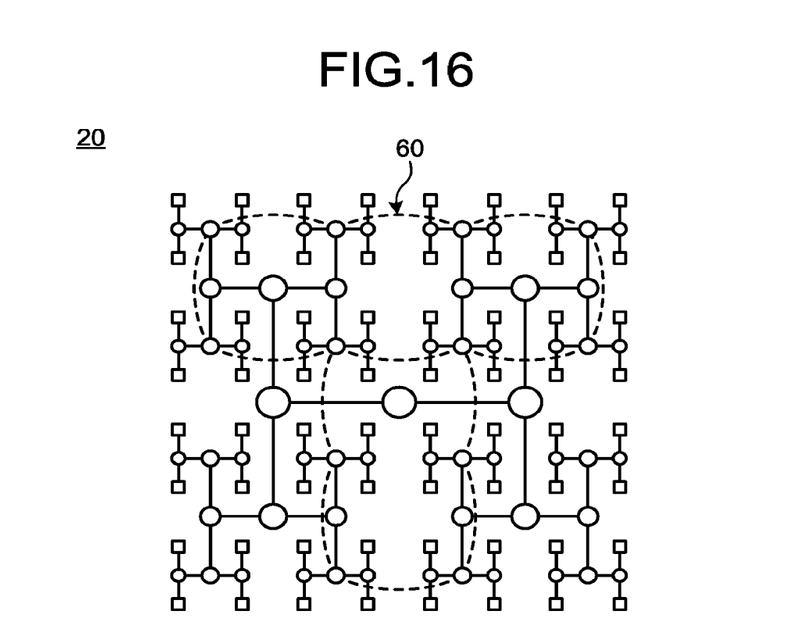
FIG. 16 is a diagram illustrating a short-cut path having a shape of combined rings.

FIG. 16 is a diagram illustrating a short-cut path 60 having a shape of combined rings. The short-cut path 60 may have any other shape than the ring shape or the line shape. For example, the short-cut path 60 may have a shape of connecting the rings as illustrated in FIG. 16.

Figure 17:
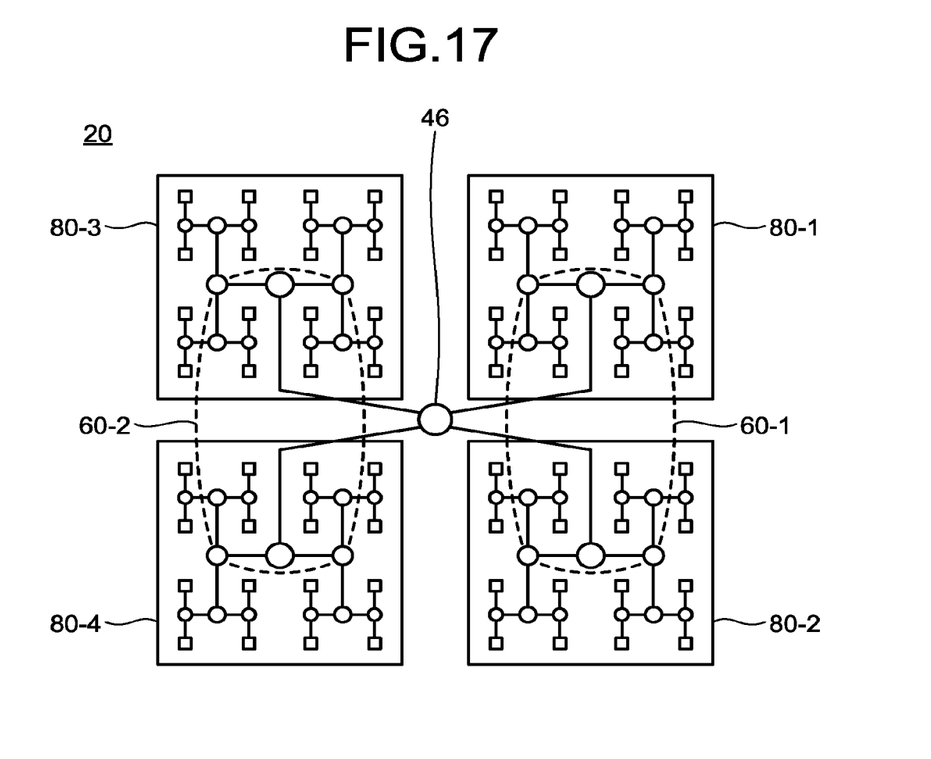
FIG. 17 is a diagram illustrating short-cut paths provided over different divisional areas.

FIG. 17 is a diagram illustrating short-cut paths 60 provided among routers 40 disposed in different divisional areas 80. In this case, the tree structure includes two or more divisional areas 80. Each of the divisional areas 80 corresponds to a partial tree whose root is a node lower than the original root node in the tree structure.

Thus, the core 30 disposed in each of the divisional areas 80 can transmit the data to another core 30 disposed in the same divisional area 80 without passing a root router 46 corresponding to the original root node. In this case, the short-cut path 60 may include the route connecting two or more routers 40 disposed in two or more different divisional areas 80 among the divisional areas 80.

In the example in FIG. 17, the data processing unit 20 includes a first divisional area 80-1, a second divisional area 80-2, a third divisional area 80-3, and a fourth divisional area 80-4, each being connected to the root router 46. The first short-cut path 60-1 connects four routers 40 disposed separately in the first divisional area 80-1 and the second divisional area 80-2. The second short-cut path 60-2 connects four routers 40 disposed separately in the third divisional area 80-3 and the fourth divisional area 80-4. Note that the short-cut path 60 may connect the routers 40 disposed separately in three or more divisional areas 80.

When data is transferred along the tree path 50 between two different divisional areas 80, it may take long to transfer the data since the transfer is carried out via the root router 46. However, in the neural network apparatus 10 described above, two routers 40 disposed separately in the two different divisional areas 80 are connected to the short-cut path 60. Thus, this neural network apparatus 10 can reduce the data transfer time between the two different divisional areas 80.

Figure 18:
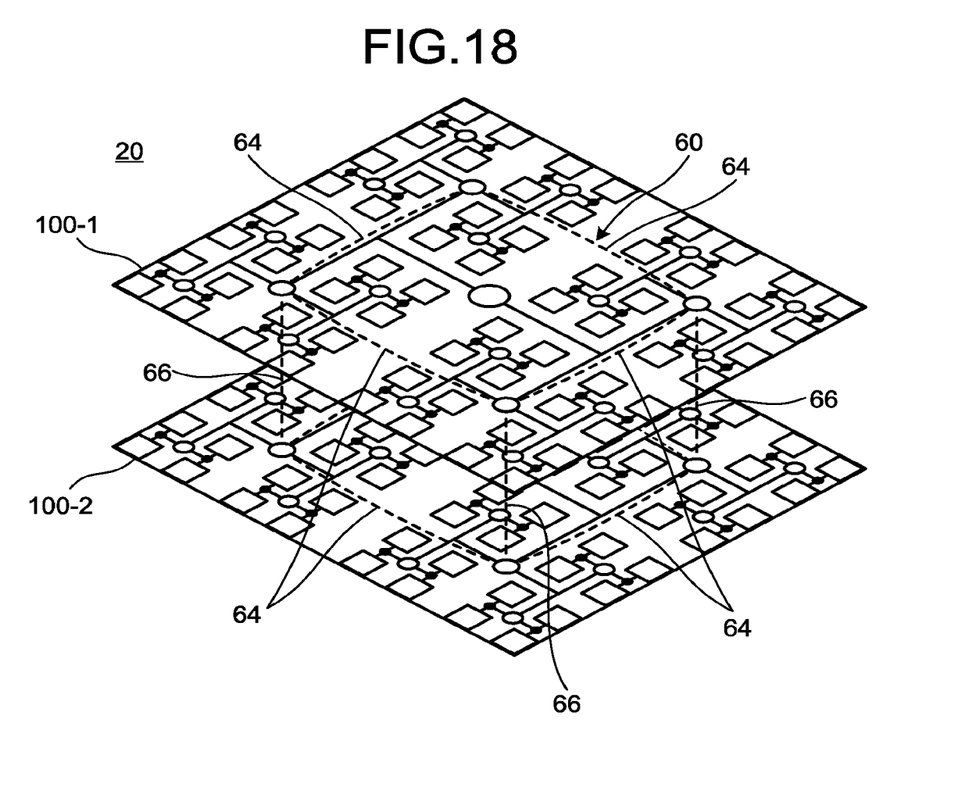
FIG. 18 is a perspective view of a data processing unit provided on substrates.
Figure 19:
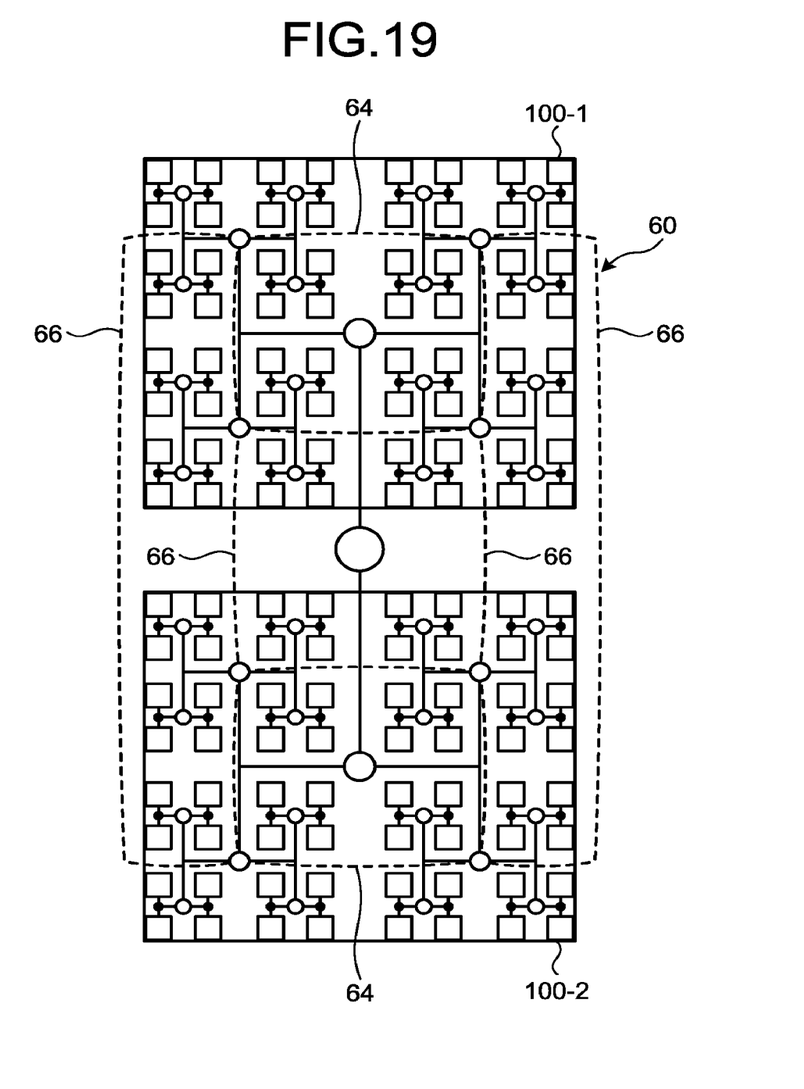
FIG. 19 is a plan view of each substrate and short-cut paths.

FIG. 18 is a perspective view of a data processing unit 20 provided on substrates 100. FIG. 19 is a plan view of each substrate 100 and short-cut paths 60 provided on the substrates 100.

The data processing unit 20 further includes two or more substrates 100. Each of the substrates 100 may be a layer in semiconductor. The substrates 100 are attached together while being stacked on each other, thereby forming a single device as a whole.

The substrates 100 have one-to-one correspondence with partial trees, each being a division of the tree structure. Each of the substrates 100 is provided with two or more cores 30 and two or more routers 40 for two or more leaves and two or more nodes included in the corresponding partial tree. Each of the substrates 100 also includes the tree path 50 for connecting the two or more cores 30 and the two or more routers 40 that are provided on the substrate 100 in accordance with the tree structure.

The substrates 100 also include the short-cut path 60. In this case, the short-cut path 60 includes a route that connects the routers 40 separately provided on two of the substrates 100.

In the example in FIG. 18 and FIG. 19, the data processing unit 20 includes a first substrate 100-1 and a second substrate 100-2. The short-cut path 60 includes on-board lines 64 for connecting two or more routers 40 in the ring shape on each of the first substrate 100-1 and the second substrate 100-2.

In addition, the short-cut path 60 includes interlayer lines 66 for connecting the router 40 in the first substrate 100-1 and the router 40 in the second substrate 100-2. Thus, the short-cut path 60 can connect the router 40 provided on the first substrate 100-1 and the router 40 provided on the second substrate 100-2.

In the neural network apparatus 10 described above, the cores 30 can be separately provided on different substrates 100. Generally, when data is transmitted along the tree path 50 by via the routers 40 separately provided on such different substrates 100, it takes relatively long to transfer the data. In this regard, in the neural network apparatus 10 according to the embodiment, those routers 40 on the different substrates 100 are connected with the short-cut path 60. Consequently, the neural network apparatus 10 can be provided with many cores 30 and can transfer data efficiently as a whole.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A neural network apparatus comprising:
a plurality of cores provided in accordance with a plurality of leaves in a tree structure, each core serving as a circuit that performs calculation or processing for part of elements of the neural network;
a plurality of routers provided in accordance with nodes other than the plurality of leaves in the tree structure;
a tree path that connects the plurality of cores and the plurality of routers such that data is transferred along the tree structure; and
a short-cut path that connects part of the plurality of routers such that data is transferred on a route differing from the tree path,
wherein the plurality of cores is configured to:
perform a normal calculation process in accordance with the neural network and a learning process for changing coefficients included in the neural network in parallel,
in the normal calculation process, propagate calculation data in a forward direction over a plurality of layers in the neural network, and in the learning process, propagate learning data in a backward direction over the plurality of layers in the neural network, and
wherein the plurality of routers transmit data, which is output from each of the plurality of cores, to any of the plurality of cores serving as a transmission destination on one of routes included in the tree path and the short-cut path such that the calculation or the processing is performed in accordance with a structure of the neural network,
wherein among the plurality of routers, a first router connected to the short-cut path is configured to:
when received data is the calculation data, detect a transfer route for transmitting the received data to the core as the transmission destination from among the routes included in the tree path and the short-cut path, and transmit the received data, among the plurality of routers, to a next router that is next to the first router and that is determined in accordance with the transfer route, and
when the received data is the learning data, transmit the received data, among the plurality of routers, to a next router that is next to the first router and that is determined in accordance with the tree path.

2. The apparatus according to claim 1, wherein the short-cut path includes a route connecting two or more routers, which are part of the plurality of routers, in a ring shape.

3. The apparatus according to claim 1, wherein the short-cut path includes a route connecting two or more routers, which are part of the plurality of routers, in a line shape.

4. The apparatus according to claim 2, wherein the short-cut path is a route connecting two or more routers disposed in a predetermined layer in the tree structure.

5. The apparatus according to claim 4, wherein, when a number of layers at a leaf farthest from a root node is N, the short-cut path is a route connecting two or more routers disposed in an {N/2}-th, {(N+1)/2}-th, or {(N-1)/2}-th layer from the root node.

6. The apparatus according to claim 2, wherein the short-cut path includes a route connecting two or more routers disposed in two different layers in the tree structure.

7. The apparatus according to claim 1, wherein
the tree structure includes divisional areas,
each core disposed in each of the divisional areas is capable of transmitting data to another core disposed in a same divisional area without passing the root node, and
the short-cut path includes a route that connects two or more routers disposed in two or more different divisional areas in the divisional areas.

8. The apparatus according to claim 1, further comprising substrates that have one-to-one correspondence with partial trees being divisions of the tree structure, each of the substrates being provided with two or more cores and two or more routers for two or more nodes and two or more leaves included in the corresponding partial tree,
wherein the short-cut path includes a route that connects the routers provided separately on two substrates of the substrates.

9. A data transfer method comprising:
transferring data of a neural network apparatus, wherein the neural network apparatus comprises:
a plurality of cores provided in accordance with a plurality of leaves in a tree structure, each core serving as a circuit that performs calculation or processing for part of elements of the neural network;

a plurality of routers provided in accordance with nodes other than the plurality of leaves in the tree structure;

a tree path that connects the plurality of cores and the plurality of routers such that data is transferred along the tree structure; and a short-cut path that connects part of the plurality of routers such that data is transferred on a route differing from the tree path, and the method comprises:

by the plurality of cores, performing a normal calculation process in accordance with the neural network and a learning process for changing coefficients included in the neural network in parallel, wherein in the normal calculation process, calculation data is propagated in a forward direction over a plurality of layers in the neural network, and in the learning process, learning data is propagated in a backward direction over the plurality of layers in the neural network;

by the plurality of routers, transmitting data, which is output from each of the plurality of cores, to any of the plurality of cores serving as a transmission destination on one of routes included in the tree path and the short-cut path such that the calculation or the processing is performed in accordance with a structure of the neural network; and by a first router connected to the short-cut path among the plurality of routers, when received data is the calculation data, detecting a transfer route for transmitting the received data to the core as the transmission destination from among the routes included in the tree path and the short-cut path, and transmitting the received data, among the plurality of routers, to a next router that is next to the first router and that is determined in accordance with the transfer route, and when the received data is the learning data, transmitting the received data, among the plurality of routers, to a next router that is next to the first router and that is determined in accordance with the tree path.

\* \* \* \* \*